(12) United States Patent
Lee et al.

(10) Patent No.: US 7,016,584 B2
(45) Date of Patent: Mar. 21, 2006

(54) PHOTONIC BANDGAP OPTICAL FIBER

(75) Inventors: Suk-han Lee, Yongin-si (KR); Ji-deog Kim, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 10/921,858

(22) Filed: Aug. 20, 2004

(65) Prior Publication Data

US 2005/0041945 A1 Feb. 24, 2005

(30) Foreign Application Priority Data

Aug. 22, 2003 (KR) .................... 10-2003-0058115

(51) Int. Cl.
*G02B 6/20* (2006.01)
(52) U.S. Cl. .................................... 385/125
(58) Field of Classification Search ............. None
See application file for complete search history.

(56) References Cited

U.S. PATENT DOCUMENTS

| 5,600,483 | A | * | 2/1997 | Fan et al. ............... 359/245 |
| 6,539,155 | B1 | | 3/2003 | Broeng et al. |
| 6,597,851 | B1 | * | 7/2003 | Johnson et al. ........... 385/131 |
| 6,625,364 | B1 | * | 9/2003 | Johnson et al. ........... 385/127 |

2002/0181911 A1 * 12/2002 Wadsworth et al. ........ 385/125

FOREIGN PATENT DOCUMENTS

WO WO 99/64904 A1 12/1999
WO WO 00/06506 A1 2/2000

OTHER PUBLICATIONS

Cregan et al. "Single-Mode Photonic Band Gap Guidance of Light in Air"; Science, 285, 1537, 1999.*

* cited by examiner

*Primary Examiner*—Frank G. Font
*Assistant Examiner*—James P. Hughes
(74) *Attorney, Agent, or Firm*—Sughrue Mion, PLLC

(57) ABSTRACT

A photonic band-gap optical fiber is disclosed. The photonic band-gap optical fiber includes a photonic crystal having plural band-gaps. The photonic crystal includes a first medium having a first permittivity; plural second media having a second permittivity, and formed in a first periodic arrangement with respect to at least one or more directions on a plane formed of the first medium; and plural third media having a third permittivity, formed in a second periodic arrangement with respect to at least one or more directions on the plane formed of the first medium, and formed in a third periodic arrangement with respect to at least one or more directions together with the plural second media. The photonic crystal has a hollow portion for propagating light passing through the plane formed of the first medium. The photonic band-gap optical fiber can be used to propagate light of plural, different bands at the same time.

10 Claims, 6 Drawing Sheets

PHOTONIC BANDGAP OPTICAL FIBER

CROSS-REFERENCE TO RELATED APPLICATIONS

This application claims benefit under 35 U.S.C. § 119 from Korean Patent Application No. 2003-58115, filed on Aug. 22, 2003, the entire content of which is incorporated herein by reference.

BACKGROUND OF THE INVENTION

1. Field of the Invention

The present invention relates to photonic bandgap optical fibers, and more particularly, to photonic bandgap optical fibers capable of guiding light of multiple bands by use of a photonic crystal structure forming plural band-gaps.

2. Description of the Related Art

In general, optical fibers consist of a core of glass or plastic material having a higher refractive index inside a clad of glass or plastic material having a lower refractive index. Light propagates along the inner core due to total internal reflection, by which information can be sent. The optical fibers are so light-weighted and thin that they do not take up much space, but provide a high transmission speed and a low error rate. Thus, optical fibers are widely used in data transmission fields requiring a high rate of data transmission and reception and high reliability. However, in optical fibers light propagates through a solid core so that the core material causes scattering, dispersion, or absorption loss, which limit their efficiency.

Thus, photonic band-gap optical fibers which guide light by means of photonic band-gaps are of more interest even though the refractive index of the core is lower than that of the clad. In a photonic band-gap optical fiber, a photonic crystal structure is used to form photonic band-gaps. The photonic crystal structure has dimensions on the order of a few hundred nm to a few thousand $\mu$m depending on the frequency band to be used, and has substances with different refractive indexes that are regularly arranged. The photonic crystal is used to form a complete band-gap that does not pass polarized light irrespective of its incident angle, and further is used to form an absolute band-gap that passes no light independent of polarization. Due to such characteristics, the photonic crystal can be used to fabricate optical devices such as split filters, optical waveguides, optical delay devices, and optical fibers.

On the other hand, the photonic crystal has three kinds of structures such as one dimensional, two dimensional, and three dimensional structures, depending upon the number of periodic orientations. A variety of detailed structures have been proposed for all dimensions. For example, if an appropriate structure is selected for a two-dimensional photonic crystal, an absolute band-gap can be formed that prevents light having a wavelength about two times longer than a grid constant from propagating in any direction within the periodic structure. The characteristics of such a photonic crystal are determined by factors such as grid shape, grid constant, shape of an inserted pile, and the like. Further, if a round pile is filled, the characteristics of the photonic crystal are determined by its radius, permittivity of a background material, permittivity of the filled pile, and the like.

FIG. 1 is a view showing a two-dimensional photonic crystal structure. FIG. 1 depicts a photonic crystal whose cross-section is two dimensional (having two dimensions in the x-y cross-section), and where second media 15 of a cylindrical shape of radius of R having a second permittivity are periodically arranged in the first medium 13 having a first permittivity. The relationships between wave vectors and frequencies for the photonic crystal structure of FIG. 1 can be obtained by solving the Maxwell equations.

FIG. 2 is a view showing band-gaps for the photonic crystal structure of FIG. 1 having a grid constant p and a propagation vector $\beta$ in a z-direction which is a light propagation direction. Here, silica having a refractive index of 1.45 is used for the first medium 13 and the filling factor is 0.7.

FIG. 3 is a cross-sectioned view showing a conventional photonic band-gap optical fiber. As shown in FIG. 3, a conventional photonic band-gap optical fiber 30 has a first medium 33 having a first permittivity and a second medium 35 of cylindrical shape arranged in the first medium 33 using the photonic crystal shown in FIG. 1. Further, the photonic band-gap optical fiber 30 has a local hollow portion 37 formed in its center which breaks or rather interrupts the periodic arrangement of the second medium 35. The local hollow portion 37 formed in the center forms a defect mode so that light can propagate within the center of the fiber.

FIG. 4 is a view showing a propagation mode of the conventional photonic band-gap optical fiber of FIG. 3. As shown in FIG. 4, light is concentrated about the center of the photonic band-gap optical fiber. Light, excepting the center, is blocked due to the band-gap, which can be seen by measuring the intensity of an electric field. Thus, light can propagate through such a photonic bandgap optical fiber, and the frequency band can be wider as compared with general optical fibers.

However, as mentioned above, the conventional photonic band-gap optical fiber is based on a photonic crystal structure having one band-gap for a specific propagation constant as a scale parameter is varied. Therefore, in a conventional photonic band-gap optical fiber, plural modes of light of different bands can not propagate at the same time. This is because its fundamental mode which allows light to propagate exists only in one band region.

SUMMARY OF THE INVENTION

The present invention has been achieved in order to solve the above drawbacks and other problems associated with the above-described conventional arrangement. It is therefore an object of the present invention to provide a photonic band-gap optical fiber through which plural modes of light of different bands can propagate by employing a photonic crystal having plural band-gaps for a specific propagation constant.

The foregoing and other objects and advantages have been realized by providing a photonic band-gap optical fiber comprising a photonic crystal having plural band-gaps, the photonic crystal comprising a first medium having a first permittivity; plural second media having a second permittivity, and formed in a first periodic arrangement with respect to at least one or more directions on a plane formed of the first medium; and plural third media having a third permittivity, formed in a second periodic arrangement with respect to at least one or more directions on the plane formed of the first medium, and formed in a third periodic arrangement with respect to at least one or more directions together with the plural second media, wherein the photonic crystal has a hollow portion for propagating light passing through the plane formed of the first medium.

The hollow portion is preferably formed to interrupt the first and second periodic arrangements of the plural second and third media. Further, the distance to the farthest point of the third media nearest from a center of the photonic crystal is preferably smaller than a distance to a nearest point of the second media nearest the center of the photonic crystal.

The second permittivity is larger in value than the first permittivity, and the third permittivity has a value between the first permittivity and the second permittivity. The third media are arranged within a unit cell formed of the plural second media or on boundaries of a unit cell formed of the plural second media. Further, the hollow portion can be formed by omitting at least one or more of the plural second and third media at certain locations or by varying a size of at least one or more of the plural second and third media at certain locations.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, the present invention will be described in detail with reference to the accompanying drawings. However, the present invention should not be construed as being limited thereto.

Figure 1:
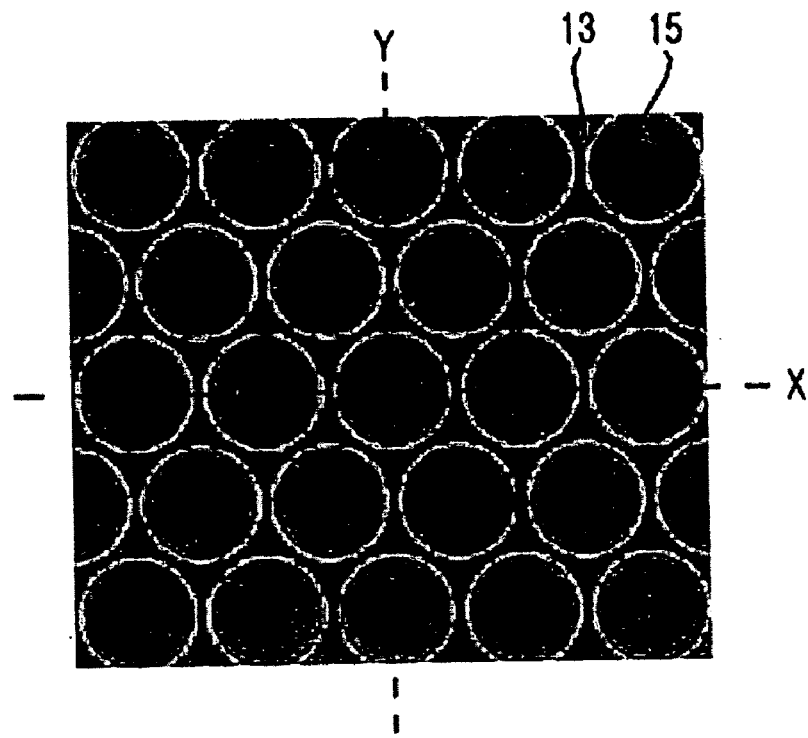
FIG. 1 is a view showing a two-dimensional photonic crystal structure.
Figure 2:
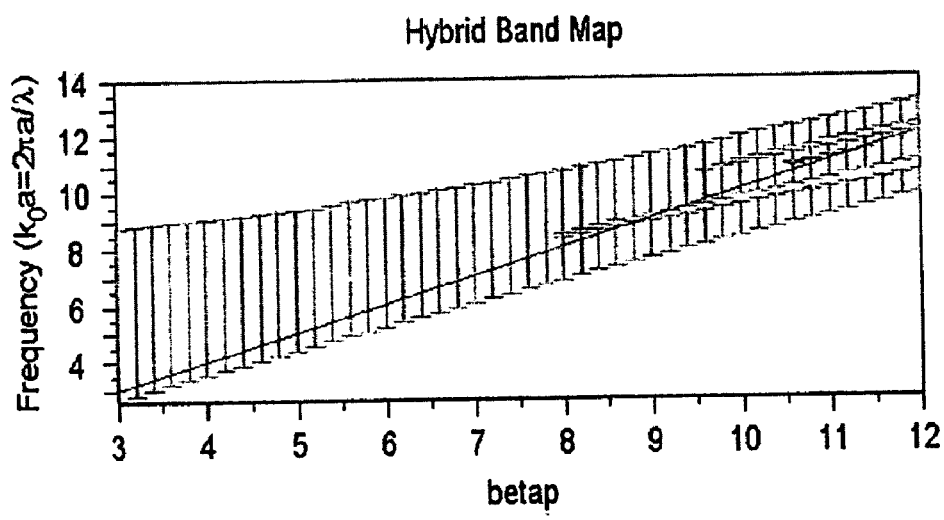
FIG. 2 is a view showing a band-gap for the photonic crystal structure of FIG. 1.
Figure 3:
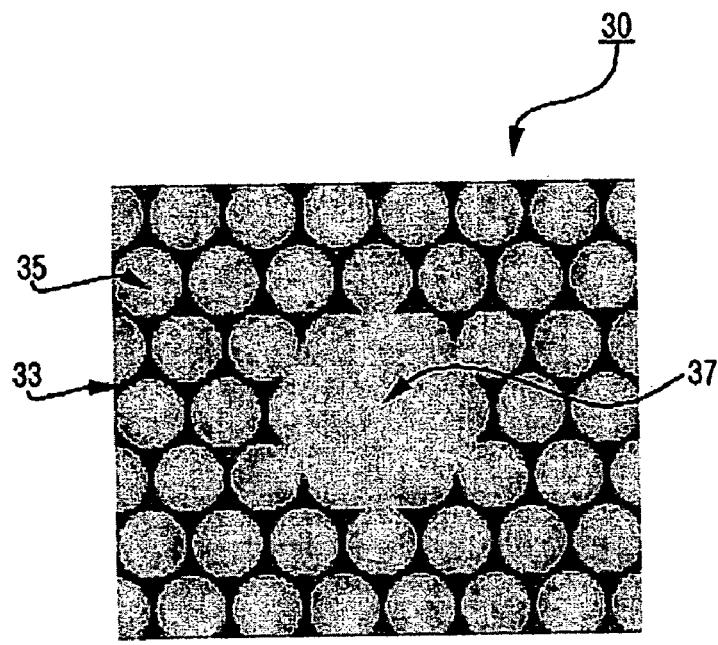
FIG. 3 is a cross-sectional view showing a conventional photonic band-gap optical fiber.
Figure 4:
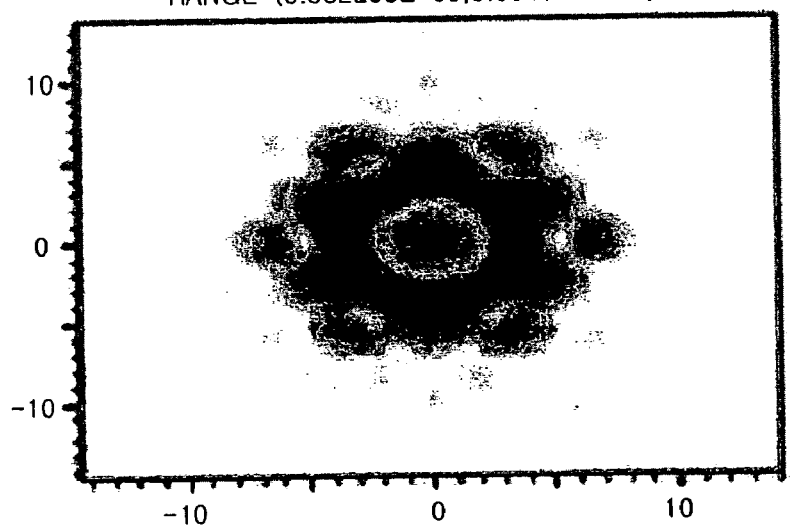
FIG. 4 is a view showing a propagation mode of the conventional photonic band-gap optical fiber of FIG. 3.
Figure 5:
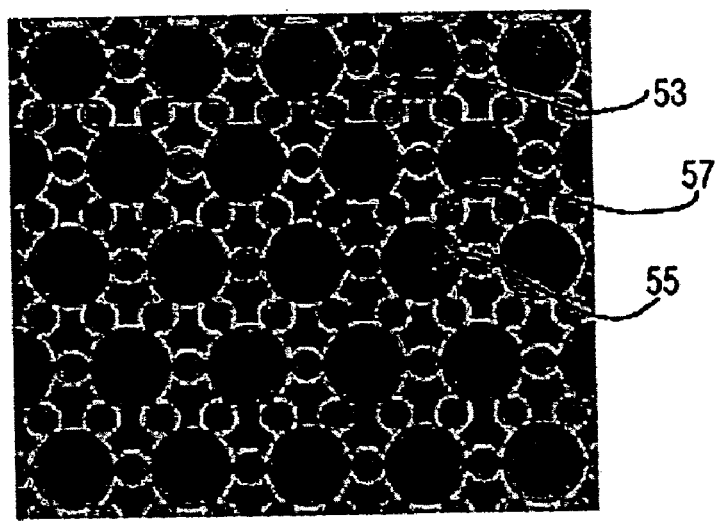
FIG. 5 is a view showing a photonic crystal structure for use in a photonic band-gap optical fiber according to an embodiment of the present invention.

FIG. 5 is a view showing a photonic crystal structure for use in a photonic band-gap optical fiber according to an embodiment of the present invention. In FIG. 5, the photonic crystal structure has a first medium 53 having a first permittivity, plural second media 55 having a second permittivity and formed in a first periodic arrangement with respect to at least one or more directions on a plane defined by the first medium 53, and plural third media 57 having a third permittivity and formed in a second periodic arrangement on a plane defined by the first medium 53. The third media 57 are arranged within unit cells formed of the second media 55 to form a third periodic arrangement with respect to at least one or more directions, together with the second media 55, to thereby form plural photonic band-gaps.

Figure 6:
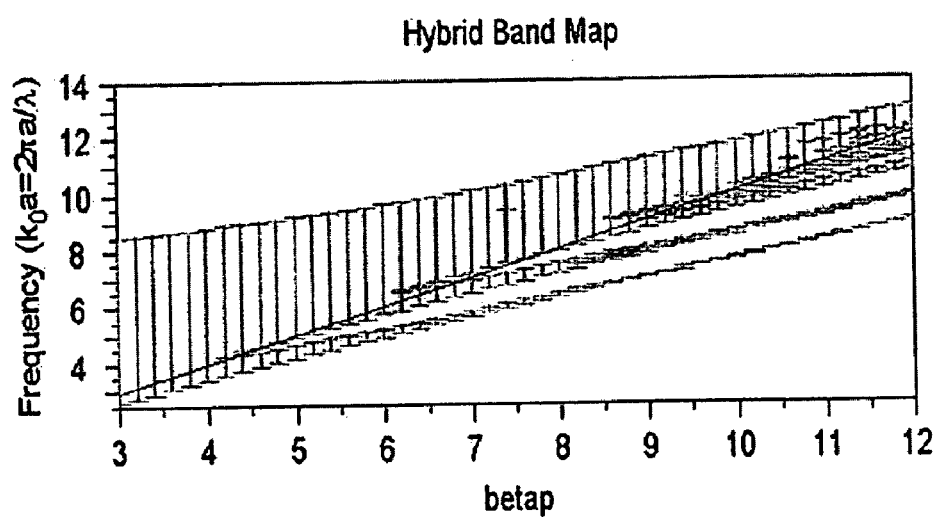
FIG. 6 is a view showing the photonic band-gap structure of FIG. 5.

FIG. 6 is a view showing band-gaps in the photonic crystal structure of FIG. 5. In FIG. 6, the x-axis represents the propagation constant value multiplied by a grid constant p, and the y-axis denotes frequency. Here, the first medium 53 is silica having a refractive index of 1.45, and air is used for the second medium 55, and the radius of the second media 55 is 0.8 times R which is the radius before interpolation (filling factor is 0.7). Air is also used for the third media 57, and the radius of the third media 57 is 0 before interpolation, but 0.2 times the radius R after interpolation. Further, the grid interval for the first periodicity of the second media 55 before interpolation is 2p, and the grid interval of the third periodicity of the second media 55 and third media 57 after interpolation is p.

The photonic crystal structure used for the photonic band-gap optical fiber according to the present invention is described in detail in the Republic of Korea Patent Application No. 10-2002-0024761 entitled "Photonic Crystal Structure" filed by the Applicant, incorporated herein by reference.

Figure 7:
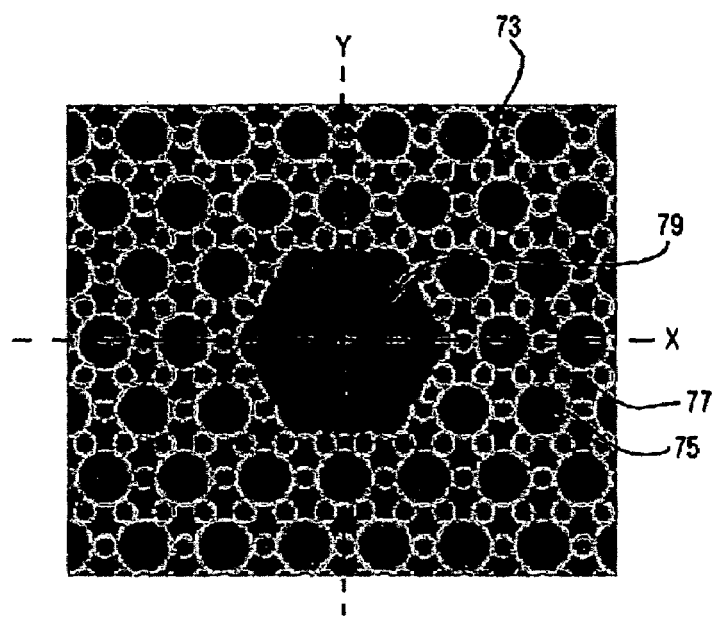
FIG. 7 is a cross-sectioned view showing a photonic band-gap optical fiber according to another embodiment of the present invention.

FIG. 7 is a cross-sectioned view showing a photonic bandgap optical fiber according to the present invention.

The photonic band-gap optical fiber according to the present invention incorporates the photonic crystal shown in FIG. 5. As shown in FIG. 7, the photonic band-gap optical fiber according to the present invention has a first medium 73 having a first permittivity, plural second media 75 formed in a first periodic arrangement in the first medium 73, and plural third media 77 formed in a second periodic arrangement, when viewed on an x-y plane. Also, the photonic band-gap optical fiber has a hollow center 79 interrupting the periodic arrangements of the second media 75 and the third media 77. Here, the second and third media 75 and 77 have second and third permittivities respectively, and the second permittivity is higher than the first permittivity, and the third permittivity has a value between the first permittivity and the second permittivity.

The third media 77 are arranged so that the length from the center to the outermost edge is smaller than the distance from the second media 75 nearest the center. That is, the third media 77 each has a size that can be filled in unit cells formed of the plural second media 75, and are arranged so as not to overlap the second media 75. Further, the third media 77 are arranged within the unit cells formed of the plural second media 75, but can be used on the boundaries between the unit cells formed of the second dielectric substances.

The hollow core 79 can be formed by omitting one or more of the plural periodically arranged second and third media 75 and 77. In contrast to FIG. 5, FIG. 7 shows a hollow core corresponding to seven second media 75. The hollow center 79 can be formed by omitting the second and third media 75 and 77 as above, and can also be formed by changing the size and shape of one or more of the periodic second and third media 75 and 77.

Figure 8:
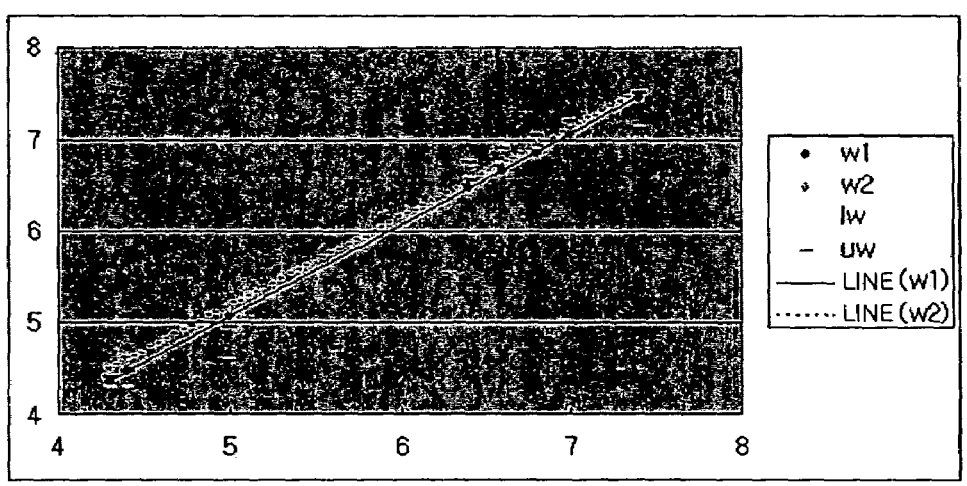
FIG. 8 is a view showing propagation mode frequencies which vary depending on the propagation constant in the photonic band-gap optical fiber according to an embodiment of the present invention.

FIG. 8 is a view showing propagation mode frequencies which vary depending upon propagation constants in the photonic band-gap optical fiber according to an embodiment of the present invention. That is, FIG. 8 shows band-gap variations and corresponding propagation modes depending on the magnitudes of the propagation vectors along the z-axis which represent the light propagation direction in the photonic band-gap optical fiber according to an embodiment of the present invention, and also shows a few fundamental modes and the second modes.

Figure 9:
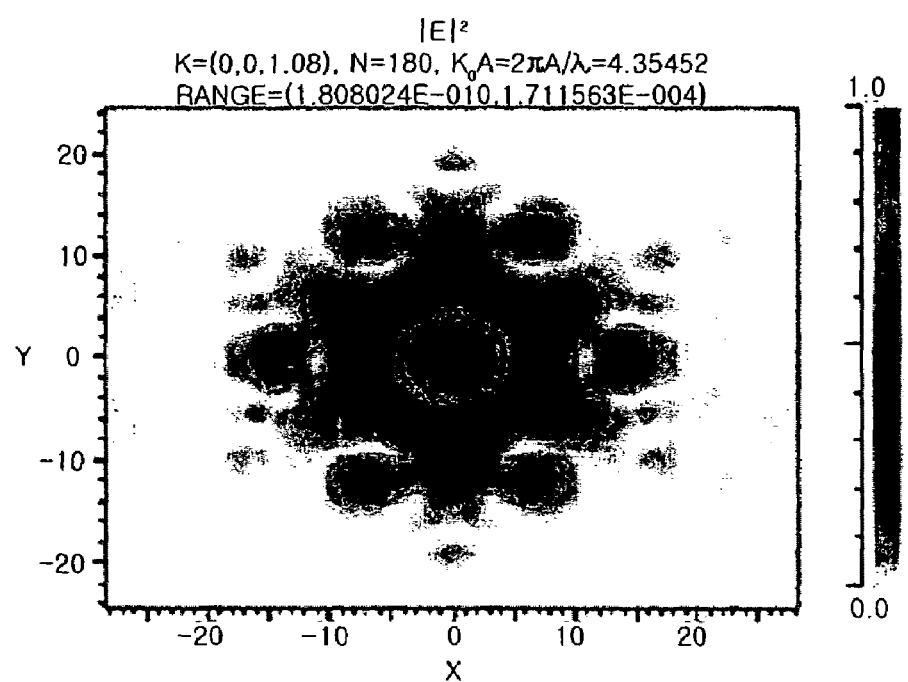
FIG. 9 and FIG. 10 are views illustrating the propagation mode for the photonic band-gap optical fiber according to an embodiment of the present invention.
Figure 10:
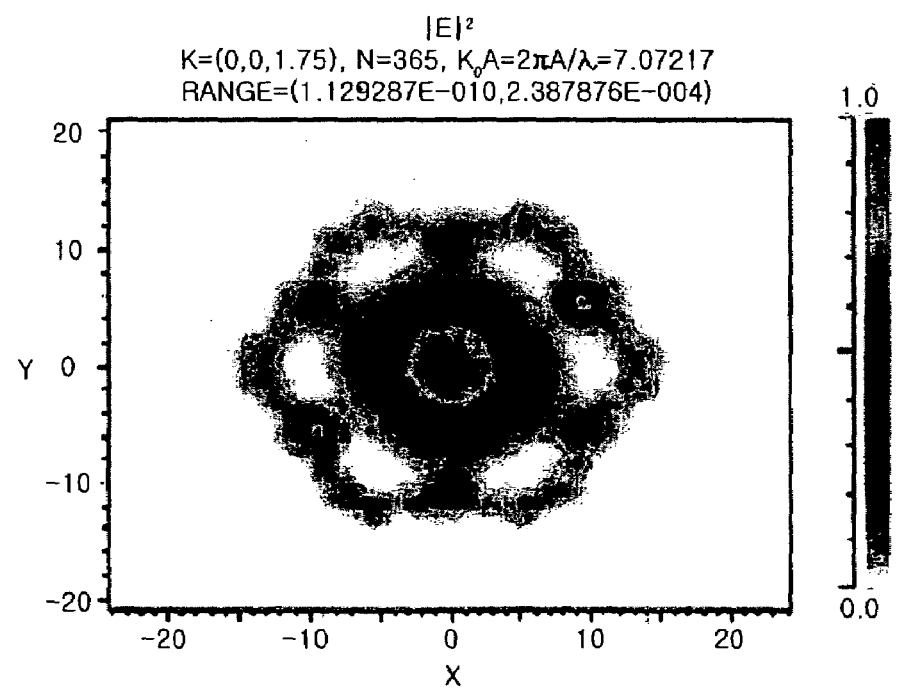

FIG. 9 and FIG. 10 illustrate propagation modes appearing in the photonic band-gap optical fiber according to an embodiment of the present invention. FIG. 9 shows a mode calculated by use of the super cell method, that is, FIG. 9 shows a cross-sectional view as to the intensity of an electric field when the propagation constant is 4.3. Here, a 14×14 super cell is used, and it is shown that the propagation frequencies exist in the band-gaps.

Likewise, FIG. 10 shows a cross section of a mode calculated by use of the super cell method in the case that the propagation constant is 7.0. Here, a 12×12 super cell is used, and it shows that the propagation frequencies exist within the band-gaps. As shown in FIG. 9 and FIG. 10, the larger the cell size, the better the degree of mode confinement, and it can be seen that the mode is confined in case of the 12×12 super cell.

Figure 11:
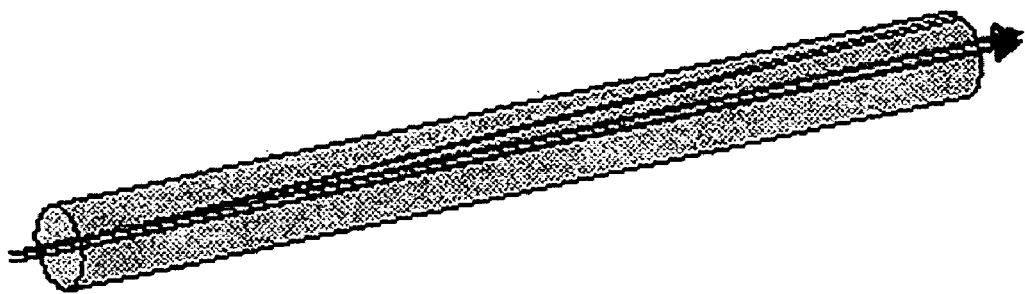
FIG. 11 is a view showing propagation of two light beams having different bands in a photonic band-gap optical fiber according to an embodiment of the present invention.

FIG. 11 is a view showing propagation of two light beams having different bands in the photonic band-gap optical fiber according to an embodiment of the present invention. In FIG. 11, colors of light in red and blue represent the two different bands, and, as described above, light of different bands can propagate at the same time.

As described above, the present invention can produce different propagation modes within plural band-gaps by use of a photonic crystal of the present invention forming plural band-gaps, through which light of plural, different bands can propagate at the same time.

The foregoing embodiments and advantages are merely exemplary and are not to be construed as limiting the present invention. The present teaching can be readily applied to other types of apparatus. Also, the description of the embodiments of the present invention is intended to be illustrative, and not to limit the scope of the claims, and many alternatives, modifications, and variations will be apparent to those skilled in the art.

What is claimed is:

1. A photonic band-gap optical fiber, comprising a photonic crystal having plural band-gaps, said photonic crystal comprising:
    a first medium having a first permittivity;
    plural second media having a second permittivity, and formed in a first periodic arrangement with respect to at least one direction on a plane formed of the first medium; and
    plural third media having a third permittivity, formed in a second periodic arrangement with respect to at least one direction on the plane formed of the first medium, and formed in a third periodic arrangement with respect to at least one direction together with the plural second media, wherein the photonic crystal has a hollow portion for propagating light passing through the plane formed of the first medium.

2. The photonic band-gap optical fiber as claimed in claim 1, wherein the hollow portion interrupts the first and second periodic arrangements of the plural second and third media, respectively.

3. The photonic band-gap optical fiber as claimed in claim 1, wherein a distance to the farthest point of the third media nearest from a center of the photonic crystal is smaller than a distance to a nearest point of the second media nearest the center of the photonic crystal.

4. The photonic band-gap optical fiber as claimed in claim 1, wherein the second permittivity is larger in value than the first permittivity.

5. The photonic band-gap optical fiber as claimed in claim 4, wherein the third permittivity has a value between the first permittivity and the second permittivity.

6. The photonic band-gap optical fiber as claimed in claim 1, wherein the third media are arranged within unit cells formed of the plural second media.

7. The photonic band-gap optical fiber as claimed in claim 1, wherein the third media are arranged on boundaries of unit cells formed of the plural second media.

8. The photonic band-gap optical fiber as claimed in claim 1, wherein the hollow portion is formed by omitting at least one of the plural second and third media at certain locations.

9. The photonic band-gap optical fiber as claimed in claim 1, wherein the hollow portion is formed by varying a size of at least one of the plural second and third media at certain locations.

10. The photonic band-gap optical fiber as claimed in claim 1, wherein the hollow portion is formed by varying a shape of at least one of the plural second and third media at certain locations.

* * * * *